United States Patent
Qiu et al.

(10) Patent No.: US 7,418,065 B2
(45) Date of Patent: Aug. 26, 2008

(54) MULTICARRIER RECEIVERS AND METHODS FOR DETECTING CYCLIC PREFIXES HAVING UNKNOWN LENGTHS

(75) Inventors: Sigang Qiu, Cupertino, CA (US); Minh-Anh Vuong, San Jose, CA (US); Atul Salvekar, Sunnyvale, CA (US); Xiaoshu Qian, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 719 days.

(21) Appl. No.: 10/954,650

(22) Filed: Sep. 29, 2004

(65) Prior Publication Data

US 2006/0067412 A1    Mar. 30, 2006

(51) Int. Cl.
*H03D 1/00* (2006.01)
(52) U.S. Cl. .................. 375/343; 375/143; 375/152; 375/260; 708/314; 708/422
(58) Field of Classification Search .................. 375/342, 375/260, 143, 152; 708/314, 422
See application file for complete search history.

(56) References Cited

U.S. PATENT DOCUMENTS 6,658,063 B1 * 12/2003 Mizoguchi et al. .......... 375/260
6,928,048 B1 * 8/2005 Do et al. ..................... 370/208
2003/0067999 A1 * 4/2003 Echavarri et al. ........... 375/343
2005/0008088 A1 * 1/2005 Liu et al. .................... 375/260
2005/0265488 A1 * 12/2005 Jung .......................... 375/340

FOREIGN PATENT DOCUMENTS

| WO | WO-99/17492 A1 | 4/1999 |
| WO | WO 9917492 A1 | 4/1999 |
| WO | WO-2004/012452 A1 | 2/2004 |
| WO | WO-2006/039546 A1 | 4/2006 |

OTHER PUBLICATIONS

"International Search Report for corresponding PCT Application No. PCT/US2005/035287", (Feb. 27, 2006), 4 pgs.
"European Application No. 19744 Office Action", (Sep. 21, 2007), 8 pgs.
"European Application No 19744 Office Action", (Sep. 21, 2007), 8 pgs.
"International Search Report for corresponding PCT Application No. PCT/US2005/035287", (Feb. 27, 2006), 4 pgs.

* cited by examiner

*Primary Examiner*—Mohammad H. Ghayour
*Assistant Examiner*—Juan A Torres
(74) *Attorney, Agent, or Firm*—Schwegman, Lundberg & Woessner, P.A.; Gregory J. Gorrie

(57) ABSTRACT

A multicarrier receiver sequentially correlates two training symbols to determine a length of a cyclic prefix associated with each of the training symbols.

27 Claims, 4 Drawing Sheets

MULTICARRIER RECEIVERS AND METHODS FOR DETECTING CYCLIC PREFIXES HAVING UNKNOWN LENGTHS

TECHNICAL FIELD

Embodiments of the present invention pertain to wireless communications. Some embodiments relate to multicarrier communications, and some embodiments relate to broadband wireless metropolitan area networks (WMANs) and WiMax systems.

BACKGROUND

Many multicarrier communication systems, including orthogonal frequency divisional multiplexed (OFDM) communication systems, include cyclic prefixes within transmitted symbols to help reduce the effects of inter-symbol interference. A cyclic prefix may be redundant with another portion of the symbol (generally an end portion) and is removed before subsequent digital signal processing.

Some multicarrier communication systems allow the use of cyclic prefixes of different lengths. This makes detecting the cyclic prefix difficult, but mandatory. Thus there are general needs for multicarrier receivers and methods that detect a cyclic prefix of an unknown length.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
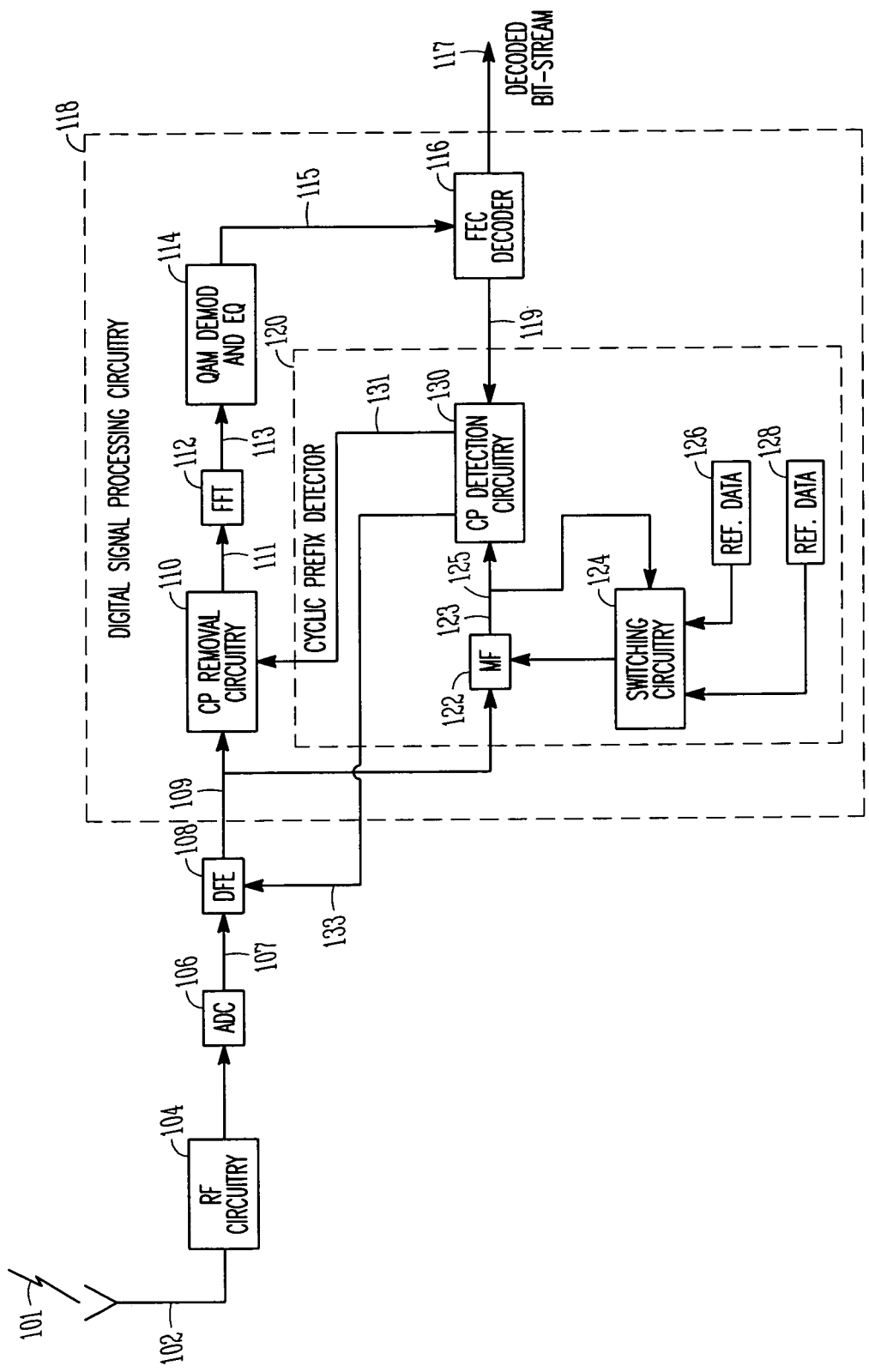
FIG. 1 is a block diagram of a multicarrier receiver in accordance with some embodiments of the present invention.

FIG. 1 is a block diagram of a multicarrier receiver in accordance with some embodiments of the present invention. Multicarrier receiver 100 may detect a cyclic prefix of an unknown length. Multicarrier receiver 100 may also determine the length of the cyclic prefix. Multicarrier receiver 100 may also verify the cyclic prefix and remove the cyclic prefix. In some embodiments, multicarrier receiver 100 derives cyclic prefix information from the pattern and structure of a preamble of a frame during a preamble phase, and qualifies the cyclic prefix during a post preamble phase to help reduce false alarm detections.

Multicarrier receiver 100 may receive multicarrier communication signals 101 through a communication channel with one or more of antennas 102 and may generate decoded bit-stream 117. In some embodiments, multicarrier signals 101 may comprise orthogonal frequency division multiplexed (OFDM) signals, although the scope of the invention is not limited in this respect.

Multicarrier receiver 100 includes radio-frequency (RF) circuitry 104 and analog-to-digital conversion (ADC) circuitry 106 to generate digital signals 107. Digital signals 107 may represent a sampled version of multicarrier signal 101 and may comprise time-domain samples. Multicarrier receiver 100 also includes digital front-end (DFE) circuitry 108 which provides sampled multicarrier signals 109 based on frame-boundary and timing information 133. Sampled multicarrier signals 109 may be time-domain samples and may comprise multicarrier or OFDM symbols. Multicarrier receiver 100 also includes digital signal processing circuitry 118 to generate decoded bit-stream 117 from sampled multicarrier signals 109. In some embodiments, DFE circuitry 108 may provide multicarrier symbols within frames to cyclic prefix removal circuitry 110 when frame-boundary and timing information 133 is known.

Digital signal processing circuitry 118 may include cyclic-prefix (CP) removal circuitry 110 to remove cyclic-prefixes from symbols of sampled multicarrier signals 109, fast-Fourier transformation (FFT) circuitry 112 to perform a Fourier transformation, such as a discrete Fourier transformation (DFT), on multicarrier symbols 111 to generate frequency-domain samples 113.

Frequency-domain samples 113 may be demodulated and equalized in circuitry 114 to generate bits 115. In some embodiments, circuitry 114 may include a quadrature-amplitude modulation (QAM) demodulator to generate bits from symbols based on a predetermined modulation level. Bits 115 may be subsequently deinterleaved and decoded by decoder 116 to generate decoded bit-stream 117. In some embodiments, decoder 116 may include a forward error correcting (FEC) decoder, although the scope of the invention is not limited in this respect.

Digital signal processing circuitry 118 may also include cyclic-prefix detector 120 to detect and determine a length of a cyclic prefix from sampled multicarrier signals 109. Cyclic-prefix detector 120 may provide length information 131 to cyclic-prefix removal circuitry 110 for removal of cyclic prefixes from multicarrier symbols. Cyclic-prefix detector 120 may also generate frame-boundary and timing information 133 for use by DFE 108.

Cyclic-prefix detector 120 may include matched filter 122 to apply first reference data 126 to sampled multicarrier communication signal 109 to generate first detection output 123. Matched filter 122 may further apply second reference data 128 to sampled multicarrier communication signal 109 after the first detection output 123 to generate second detection output 125. Cyclic-prefix detector 120 may also include cyclic prefix detection circuitry 130 to determine a length of a cyclic prefix of multicarrier symbols that comprise sampled multicarrier communication signal 109 based on a time-instance associated with the second detection output 125.

In some embodiments, cyclic-prefix detector 120 may include switching circuitry 124 to initially provide first reference data 126 to matched filter 122. Switching circuitry 124 may subsequently provide second reference data 128 to matched filter 122 in response to first detection output 123.

Although multicarrier 100 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein. In some embodiments, the functional elements of multicarrier receiver 100 and/or digital signal processing circuitry 118 illustrated in FIG. 1 may refer to one or more processes operating on one or more processing elements.

Figure 2:
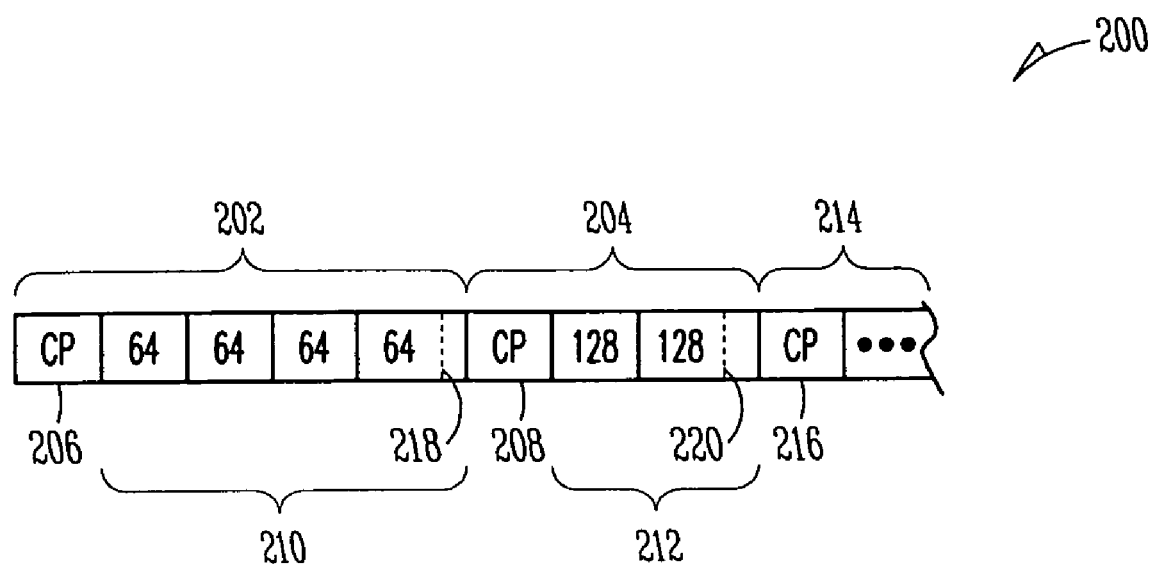
FIG. 2 illustrates a frame structure in accordance with some embodiments of the present invention.

FIG. 2 illustrates a frame structure in accordance with some embodiments of the present invention. Frame structure 200 is an example of a frame having first training symbol 202 and second training symbol 204. Training symbols 202 and 204 may be followed by one or more data symbol 214. Each symbol of frame 200 may include a cyclic prefix. For example, training symbol 202 includes cyclic prefix 206, training symbol 204 includes cyclic prefix 208, and data symbol 214 includes cyclic prefix 216. Training symbols 202 and 204 may comprise a preamble of frame 200, and the one or more data symbol 214 may comprise a post preamble of frame 200.

Figure 3A:
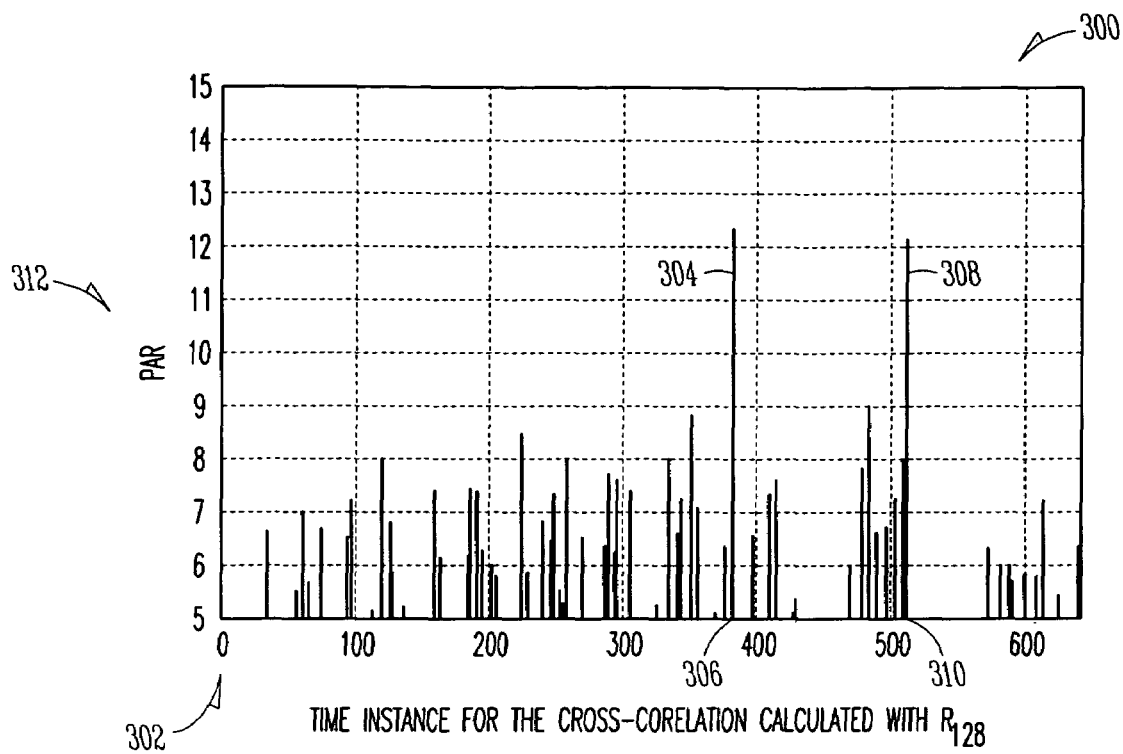
FIGS. 3A and 3B illustrate detection outputs in accordance with some embodiments of the present invention.
Figure 3B:
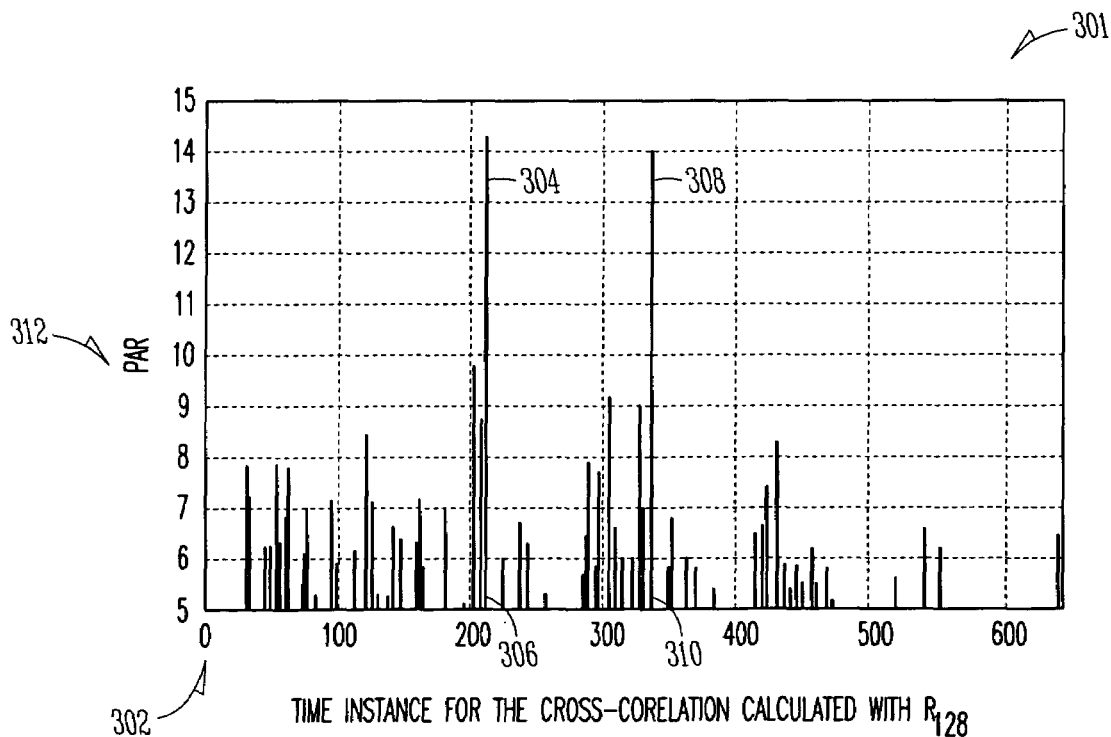

FIGS. 3A and 3B illustrate two examples of detection outputs in accordance with some embodiments of the present invention. Detection output 300 (FIG. 3A) may correspond to second detection output 125 (FIG. 1) of matched filter 122 (FIG. 1) generated from the application of second reference data 128. Detection output 301 (FIG. 3B) may also correspond to second detection output 125 (FIG. 1) of matched filter 122 (FIG. 1) generated from the application of second reference data 128 (FIG. 1). In FIGS. 3A and 3B, the x-axis illustrates the number of time-domain samples processed by matched filter 122 (FIG. 1) as a function of time when processing second reference data 128 (FIG. 1). The y-axis illustrates peak-to-average power ratio (PAR) 312 of the detection outputs of matched filter 122 (FIG. 1).

The first detection output resulting from the application of first reference data 126 (FIG. 1) may have occurred at or prior to time instance 302, and in this example, second detection outputs 304 and 308 resulting from the application of second reference data 128 (FIG. 1) may have occurred at time instances 306 and 310 respectively. Time instance 302 may be referred to as a first time instance associated with a first detection output from the application of first reference data 126 (FIG. 1), and either or both of time instances 306 and 310 are referred to as a second time instance associated with one of second detection outputs 304 or 308 from the application of second reference data 128 (FIG. 1).

Referring to FIGS. 1, 2 and 3 together, in some embodiments, cyclic prefix detection circuitry 130 may determine the length of a cyclic prefix (e.g., cyclic prefix 206 or 208) by performing a modular operation (e.g., modular by 64) on a value associated with a number of time-domain samples processed up to second time-instance 306 associated with the second detection output 304 (e.g., the number of time-domain samples from first detection output 302 to second detection output 304). Cyclic prefix detection circuitry 130 may also determine the length of a cyclic prefix (e.g., cyclic prefix 206 or 208) by performing a modular operation on a value associated with a number of time-domain samples processed up to second time-instance 310 associated with second detection output 308 (e.g., the number of time-domain samples from first detection output 302 to second detection output 308).

In some embodiments, cyclic prefix detection circuitry 130 may select a value for the length of the cyclic prefix from a set of predetermined cyclic prefix lengths based on a result of the modular operation. In some embodiments, when the modular operation does not result in exactly one of the predetermined lengths (e.g., due to noise), cyclic prefix detection circuitry 130 may select the closest one or the predetermined lengths, although the scope of the invention is not limited in this respect.

Detection output 300 (FIG. 3A) illustrates signals with quadrature phase-shift keyed (QPSK) modulation and a coding rate of ½. As illustrated, PAR detection outputs 304 and 308 in FIG. 3B occur respectively at time instances of 384 and 512 samples, which result in a detected cyclic prefix length ($N_{cp}$) of 64 (i.e., 384 or 512 modular by 64). Detection output 301 (FIG. 3B) illustrates signals with 64-quadrature amplitude-modulation (QAM) and a coding rate of ½. As illustrated, PAR detection outputs 304 and 308 in FIG. 3B occur at time instances of 208 and 337 samples, which result in a detected cyclic prefix length ($N_{cp}$) of 16 (i.e., 208 or 337 modular by 64). Modular operations, other than modular by 64, (e.g., modular by 128 or 256) are also suitable for use with embodiments of the present invention. The particular modular operation performed may depend on various system parameters.

In some embodiments in which FFT circuitry 112 uses a discrete Fourier transformation (DFT) size of 256, the predetermined lengths of cyclic prefixes may include lengths of 8, 16, 32 and 64 samples. Other lengths and DFT sizes are equally suitable. In some embodiments, when the result of the modular operation is zero, cyclic prefix detection circuitry 130 may select a greatest of the predetermined lengths (e.g., 64 samples), although the scope of the invention is not limited in this respect.

In some WiMax and IEEE 802.16 embodiments, the possible lengths of the cyclic prefix may be based on ratios of guard time ($T_g$) to useful data time ($T_b$). For example, when $T_g/T_b$ is ½2, ⅙6, ⅛ or ¼, the corresponding cyclic prefix lengths may be 8, 16, 32 and 64 for a DFT size of 256.

In some embodiments, cyclic prefix detection circuitry 130 may verify that time instance 306 or 310 associated with a second detection output is within a predetermined valid range prior to performance of the modular operation to determine the length of the cyclic prefix. In accordance with some embodiments, matched filter 122 may generate first detection output 123 at a first time instance when a peak-to-average power ratio of first detection output 123 exceeds a threshold level, and may begin application of second reference data 128 at approximately first time instance 302 to subsequently generate second detection output 125. Second detection output 125 may occur at second time instance 306 and/or 310 when a peak-to-average power ratio 312 of second detection output 304 and/or 308 exceeds a threshold level.

In some embodiments, matched filter 122 may comprise a cross-correlator to initially correlate first reference data 126 with a first portion of sampled multicarrier communication signal 109 to generate a first correlation output and to subsequently correlate second reference data 128 with a next portion of sampled multicarrier communication signal 109 to generate a second correlation output. In some embodiments, the cross-correlation calculations may be performed by FFT circuitry, such as FFT circuitry 112, although the scope of the invention is not limited in this respect.

In some embodiments, analog-to-digital conversion circuitry 106 may generate sampled multicarrier signal 107 and DFE circuitry 108 may provide time-domain samples generated from received multicarrier communication signal 101. In these embodiments, matched filter 122 may apply first reference data 126 to initial portions of the time-domain samples to generate first detection output 123. Matched filter 122 may then apply second reference data 128 to the next portions of the time-domain samples after the first detection output to generate second detection output 125.

In some embodiments, the initial portions of the time-domain samples may comprise first training symbol 202 and first reference data 126 may comprise a portion of a first training sequence. In these embodiments, the next portion of the time-domain samples may comprise second training symbol 204 and second reference data 128 may comprise a portion of a second training sequence. In these embodiments, portions of the first training sequence may correlate with portions of the first training symbol 202, and portions of the second training sequence may correlate with portions of the second training symbol 204.

In some embodiments, cyclic prefix detector 120 may verify the determined length (i.e., $N_{cp}$) of the cyclic prefix. In these embodiments, matched filter 122 may verify the length of the cyclic prefix by performing a correlation between a first number ($N_{cp}$) of samples and a last number ($N_{cp}$) of samples of a subsequently received symbol, such as data symbol 214. In some embodiments, the length of the cyclic prefix may be verified when matched filter 122 generates a detection or correlation output greater than a predetermined threshold value. In some embodiments, cyclic prefix detection circuitry 130 may use a peak threshold detector to help eliminate false alarm detections, although the scope of the invention is not limited in this respect.

In some embodiments, decoder 116 may perform an error-checking operation (e.g., a cyclic-redundancy check) on bit stream 115. In these embodiments, decoder 116 may provide error notification signal 119 to cyclic prefix detection circuitry 130 when bits of bit stream 115 fail the error-checking operation. A failure may indicate that the correct cyclic-prefix was not properly removed by circuitry 110. In response to error notification signal 119, cyclic prefix detection circuitry 130 may re-determine the length of the cyclic prefix by causing matched filter 122 to sequentially reapply first reference data 126 and second reference data 128 to training symbols of another frame.

In some embodiments, the data may be buffered so that there is no need to look at another frame. In these embodiments, an error may be detected from a frame control header message that precedes the data and the buffered data may be used again with a different cyclic-prefix length. If the cyclic-prefix length is correct, the data will likely be decoded properly. The different cyclic-prefix length may then be used for the following frame.

In some embodiments, the sampled multicarrier communication signal may comprise a sequence of multicarrier training symbols in which each of multicarrier training symbols may have a periodic structure. As illustrated in FIG. 2, first training symbol 202 has a periodic structure comprising four identical preambles of 64 samples for DFT size 210 of 256 samples, and second training symbol 204 has a periodic structure comprising two identical preambles of 128 samples for DFT size 212 of 256 samples.

In general, the cyclic prefix repeats an end portion of its associated symbol. For example, cyclic prefix 206 may be a copy of end portion 218 of training symbol 202, cyclic prefix 208 may be a copy of end portion 220 of training symbol 204, and cyclic prefix 216 may be a copy of an end portion of data symbol 214. In some embodiments, each symbol includes a cyclic prefix having a predetermined length, and a cyclic prefixes within a frame may have the same length.

In some embodiments, first reference data 126 comprises at least portion of a first (e.g., short) training sequence which correlates with a first of the training symbols 202, and second reference data 128 comprises at least portion of a second (e.g., long) training sequence which correlates with a second of the training symbols 204. In some embodiments, reference data 126 and 128 may represent filter coefficients of matched filter 122, although the scope of the invention is not limited in this respect. In some embodiments, reference data 126 and 128 may be pre-tabulated and stored in a storage element, such as non-volatile memory, associated with cyclic prefix detector 120.

In some embodiments, multicarrier receiver 100 may receive OFDM communication signals from a base station over a broadband communication channel. The broadband channel may comprise a plurality of orthogonal subcarriers. In some embodiments, the orthogonal subcarriers of a broadband channel may comprise closely spaced OFDM subcarriers. To achieve orthogonality between closely spaced subcarriers, in some embodiments, the subcarriers of a particular channel may have a null at substantially a center frequency of the other subcarriers of that subchannel.

In some embodiments, the frequency spectrums for a broadband channel may comprise channels in a 3.5 GHz frequency spectrum. In these embodiments, the 3.5 GHz frequency spectrum may include frequencies ranging from approximately 2.9 to 3.9 GHz, although the scope of the invention is not limited in this respect, as other frequency spectrums are also equally suitable.

In some embodiments, multicarrier receiver 100 may be part of wireless communication device or communication station which may receive (and/or transmit) radio-frequency (RF) communications in accordance with specific communication standards, such as the Institute of Electrical and Electronics Engineers (IEEE) standards including the IEEE 802.16 standards for wireless metropolitan area networks (WMANs), although multicarrier receiver 100 may also be suitable to receive communications in accordance with other techniques.

Antenna 102 may comprise a directional or omnidirectional antenna, including, for example, a dipole antenna, a monopole antenna, a patch antenna, a loop antenna, a microstrip antenna or other type of antenna suitable for reception signals by multicarrier receiver 100.

Figure 4:
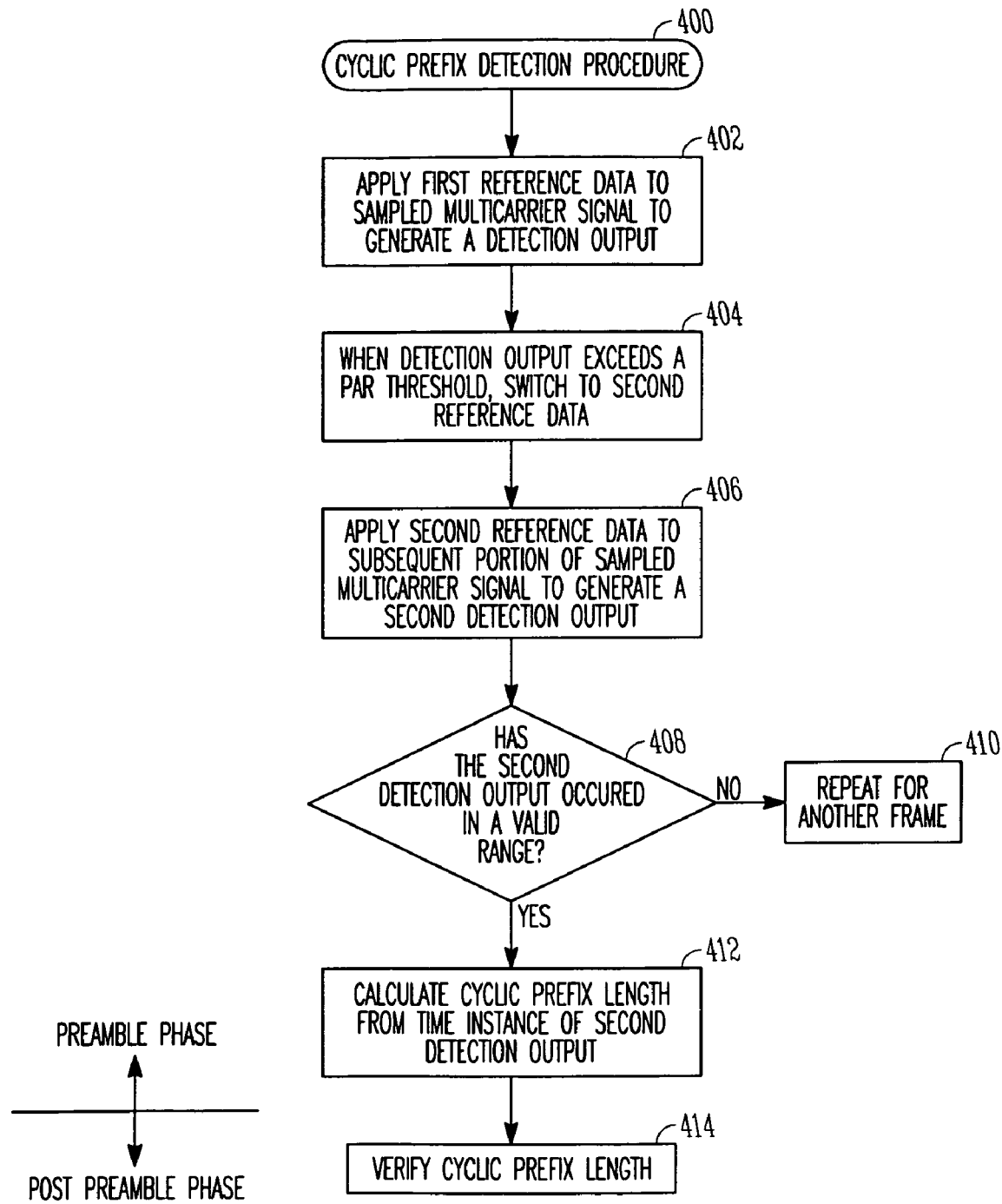
FIG. 4 is a flow chart of cyclic prefix detection procedure in accordance with some embodiments of the present invention.

FIG. 4 is a flow chart of cyclic prefix detection procedure in accordance with some embodiments of the present invention. Cyclic prefix detection procedure 400 may be performed by cyclic prefix detector 120 (FIG. 1) to detect and determine the length of cyclic prefixes during a preamble phase and to verify the cyclic prefix length during a post preamble phase. In some embodiments, processing circuitry other than cyclic prefix detector 120 (FIG. 1) may be used to perform at least portions of procedure 400.

In operation 402, first reference data is applied to a sampled multicarrier signal to generate a detection output. In some embodiments, the first reference data may comprise first reference data 126 (FIG. 1) and may be applied to a first training symbol, such as training symbol 202 (FIG. 2). The first reference data ($R_{64}$) may comprise a portion of a first training sequence that may be repeated (e.g., four times) in training symbol 202 (FIG. 2). In some embodiments, operation 402 may be performed by matched filter 122 (FIG. 1).

Operation 404 comprises switching to second reference data when a detection output from operation 402 exceeds a PAR threshold. In some embodiments, operation 404 may be performed switching circuitry 124 (FIG. 1).

Operation 406 applies the second reference data to subsequent portions of the sampled multicarrier signal to generate one or more second detection outputs. In some embodiments, the second reference data may comprise second reference data 128 (FIG. 1) and may be applied to a second training symbol, such as training symbol 204 (FIG. 2). The second reference data ($R_{128}$) may comprise a portion of a second training sequence that may be repeated (e.g., two times) in training symbol 204 (FIG. 2). In some embodiments, operation 406 may be performed by matched filter 122 (FIG. 1).

Operation 408 verifies that the second detection output generated in operation 406 is within a valid range. In some embodiments, the range includes a number of samples that may comprise second training symbol 204 (FIG. 2). When the second detection output is within the valid range, operation 412 is performed. When the second detection output is not within the valid range, operation 410 is performed.

Operation 410 may comprise repeating operations 402 through at least 408 for preambles of another frame. The performance of operation 410 may indicate that the second training symbol (e.g., symbol 204) was not detected within its window.

Operation 412 may calculate a length of the cyclic prefix ($N_{cp}$) from the time instance of the second detection output from operation 406. In some embodiments, a modular operation may be performed to generate a cyclic prefix length. The performance of operation 412 completes the preamble phase, which refers to processing of a preamble of a frame. For example, training symbol 202 (FIG. 2) and training symbol 204 (FIG. 2) may comprise the preamble of frame 200 (FIG. 2). Frames with different preamble structures (e.g., having more training symbols) may also be applicable.

Operation 414 comprises verifying the cyclic prefix length calculated in operation 412. Operation 414 may match the cyclic prefix from the beginning of a data symbol to the last bits at the end of the data symbol. When the bits match, the cyclic prefix length may be verified. In some embodiments, operation 414 may comprise performing a cross correlation between the first $N_{cp}$ number of samples and the last $N_{cp}$ number of samples of one of the data symbols, such as data symbol 214 (FIG. 2). In some embodiments, a peak-threshold detector may be used to help reduce false alarms.

Although the individual operations of procedure 400 are illustrated and described as separate operations, one or more of the individual operations may be performed concurrently, and nothing requires that the operations be performed in the order illustrated.

In some embodiments, during the preamble phase, first reference data 126 (FIG. 1) (e.g., preamble-64 reference data $R_{64}$) may comprise part of training symbol 202 (FIG. 2) (e.g., preamble-64 symbol $P_{64}$), and second reference data 128 (FIG. 1) (e.g., the preamble-128 reference data $R_{128}$) may be part of training symbol 204 (FIG. 2) (e.g., preamble-128 symbol $P_{128}$). In these embodiments, both $R_{64}$ and $R_{128}$ may be pre-tabulated. As an example, $R_{64}$ may be a first 32-sample data vector of $P_{64}$ while $R_{128}$ may be a first 32-sample data vector of $P_{128}$. Mathematically, the cross-correlations that may be performed by matched filter 122 (FIG. 1) may be described by the following equation:

$$XCORR(k) = \sum_{i=0}^{N_{taps}-1} x(i+k)r^*(i), \text{ for } k = 0, 1, 2, \ldots$$

In the above equation, x may be a sample taken from the received multicarrier communication signal and r may start with $R_{64}$ and then may switch to $R_{128}$. $N_{taps}$ may be the dimension of either $R_{64}$ or $R_{128}$, depending on whether matched filter 122 (FIG. 1) is operating with $R_{64}$ or $R_{128}$ and may be the number of reference data samples taken from first preamble symbol 202 (FIG. 2) or the second preamble symbol 204 (FIG. 2). The switching strategy employed by cyclic prefix detector 120 (FIG. 1) may help reduce silicon resources used by circuitry 118.

In accordance with some embodiments, when XCORR(k) with r as $R_{64}$, is reaching PAR value (e.g., a threshold of 11 dB), then the cross-correlation XCORR(k) calculation may be performed with r as $R_{128}$, replacing $R_{64}$ with $R_{128}$.

During the preamble-phase (i.e., operations 402-412), accurate cyclic prefix length information may generally be generated. The post-preamble phase (operation 414); however, double checks the length information to help reduce possible false-detections. The performance of operation 414 (FIG. 4) during the post-preamble phase may help reduce the number of cross-correlations between cyclic-prefix data samples ($N_{CP}$) and the last $N_{CP}$ number of data samples within an OFDM symbol. The post-preamble CP-detection process may be mathematically illustrated as follows.

$$N_{CP} = \underset{N_{CP}}{\operatorname{argmax}} \left\{ \frac{1}{N_{CP}} \sum_{k=0}^{N_{CP}-1} Re(y_k^* y_{k+N_{FFT}}) \right\}, \text{ where}$$

$\{y_0, y_1, \ldots, y_{N_{FFT}}, y_{N_{FFT}+N_{CP}-1}\}$ represents one received OFDM symbol data.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate embodiment.

What is claimed is:

1. A multicarrier receiver comprising:
a matched filter to apply first reference data to a sampled multicarrier communication signal and to generate a first detection output, the matched filter to further apply second reference data to the sampled multicarrier communication signal after the first detection output to generate a second detection output; and
cyclic prefix detection circuitry to determine a length of a cyclic prefix based on a number of time-domain samples processed up to a time-instance associated with the second detection output,
wherein the reference data is stored in memory of the receiver and is selectively coupled to the match filter.

2. The multicarrier receiver of claim 1 further comprising switching circuitry to initially provide the first reference data to the matched filter and to subsequently provide the second reference data to the matched filter in response to the first detection output.

3. The multicarrier receiver of claim 1 wherein the cyclic prefix detection circuitry is to determine the length of the cyclic prefix by performing a modular operation on a value associated with the number of time-domain samples processed up to the time-instance associated with the second detection output.

4. The multicarrier receiver of claim 3 wherein the cyclic prefix detection circuitry is to select a value for the length of the cyclic prefix from a set of predetermined lengths based on a result of the modular operation.

5. The multicarrier receiver of claim 3 wherein the cyclic prefix detection circuitry is to verify that the time instance associated with the second detection output is within a predetermined valid range prior to performance of the modular operation to determine the length of the cyclic prefix.

6. The multicarrier receiver of claim 1 wherein the time instance associated with the second detection output is a second time instance,
wherein the matched filter is to generate the first detection output at a first time instance when a peak-to-average power ratio of the first detection output exceeds a threshold level, and
wherein the matched filter is to begin application of the second reference data at approximately the first time instance and is to further generate the second detection output at the second time instance when a peak-to-average power ratio of the second detection output exceeds a threshold level.

7. The multicarrier receiver of claim 1 wherein the matched filter comprises a correlator to initially correlate the first reference data with a first portion the sampled multicarrier communication signal to generate a first correlation output and to subsequently correlate the second reference data with a next portion of the sampled multicarrier communication signal to generate a second correlation output.

8. The multicarrier receiver of claim 1 further comprising analog-to-digital conversion circuitry to generate the sampled multicarrier signal comprising time-domain samples from a received multicarrier communication signal,
wherein the matched filter is to apply the first reference data to initial portions of the time-domain samples to generate the first detection output, and is to apply the second reference data to next portions of the time-domain samples after the first detection output to generate the second detection output.

9. The multicarrier receiver of claim 8 wherein the initial portions of the time-domain samples comprise a first training symbol and the first reference data comprises a portion of a first training sequence, and
wherein the next portions of the time-domain samples comprise a second training symbol and the second reference data comprises a portion of a second training sequence,
wherein the first training sequence correlates with the first training symbol, and
wherein the second training sequence correlates with the second training symbol.

10. The multicarrier receiver of claim 1 wherein the cyclic prefix detection circuitry is to determine the length of the cyclic prefix based on the time-instance associated with the second detection output, and
wherein the matched filter is to verify the length of the cyclic prefix by performing a correlation between a first number of samples and a last number of samples of a subsequently received symbol.

11. A method of detecting a cyclic prefix comprising:
applying first reference data to a sampled multicarrier communication signal and to generate a first detection output;
applying second reference data to the sampled multicarrier communication signal in response to the first detection output to generate a second detection output; and
detecting a cyclic prefix to determine a length of the cyclic prefix based on a number of time-domain samples processed up to a time-instance associated with the second detection output,
wherein the first and second reference data is stored in memory.

12. The method of claim 11 further comprising switching between applying the first reference data and applying the second reference data in response to the first detection output.

13. The method of claim 11 wherein determining comprises performing a modular operation on a value associated with the number of time-domain samples processed up to the time-instance associated with the second detection output to detect the length of the cyclic prefix.

14. The method of claim 13 further comprising selecting a value for the length of the cyclic prefix from a set of predetermined lengths based on a result of the modular operation.

15. The method of claim 13 further comprising verifying that the time instance associated with the second detection output is within a predetermined valid range prior to performing the modular operation to determine the length of the cyclic prefix.

16. The method of claim 11 wherein the time instance associated with the second detection output is a second time instance,
wherein applying the first reference data generates the first detection output at a first time instance when a peak-to-average power ratio of the first detection output exceeds a threshold level, and
wherein applying the second reference data begins at approximately the first time instance and generates the second detection output at the second time instance when a peak-to-average power ratio of the second detection output exceeds a threshold level.

17. The method of claim 11 wherein applying the first reference data comprises initially correlating the first reference data with a first portion the sampled multicarrier communication signal to generate a first correlation output, and wherein applying the second reference data comprises subsequently correlating the second reference data with a next portion of the sampled multicarrier communication signal to generate a second correlation output.

18. The method of claim 11 further comprising:

determining the length of the cyclic prefix based on the time-instance associated with the second detection output; and generating the sampled multicarrier signal from a received multicarrier communication signal, the sampled multicarrier signal comprising time-domain samples, wherein the first reference data is applied to initial portions of the time-domain samples to generate the first detection output, and wherein the second reference data is applied to next portions of the time-domain samples after the first detection output to generate the second detection output.

19. The method of claim 11 further comprising;

removing the cyclic prefix from multicarrier symbols based on the length of the cyclic prefix; and generating frame-boundary and timing information for use in providing the multicarrier symbols within frames for removal of subsequent cyclic prefixes.

20. The method of claim 19 further comprising:

performing an error-checking operation on a bit stream generated by processing multicarrier symbols after removal of the cyclic prefix from each multicarrier symbol; and providing an error notification signal when bits of bit stream fail the error-checking operation.

21. The method of claim 20 wherein in response to the error notification signal, the method comprises re-determining the length of the cyclic prefix by instructing the matched filter to reapply the first reference data and to reapply the second reference data to another frame.

22. The method of claim 11 wherein the sampled multicarrier communication signal comprises a sequence of multicarrier training symbols, wherein each of the multicarrier training symbols has a periodic structure, wherein each multicarrier training symbol includes a cyclic prefix having a predetermined length for each symbol of a frame, and wherein the cyclic prefix repeats an end portion of its associated symbol.

23. The method of claim 22 wherein the frame comprises the training symbols followed by one or more multicarrier data symbols, and wherein each data symbol includes a cyclic prefix having the predetermined length.

24. The method of claim 22 wherein the first reference data comprises at least portion of a first training sequence which correlates with a first of the training symbols, and wherein the second reference data comprises at least portion of a second training sequence which correlates with a second of the training symbols.

25. A method comprising sequentially cross-correlating two multicarrier training symbols to detect a cyclic prefix associated with the two multicarrier training symbols by switching from correlating with first reference data to correlating with second reference data when a first correlation output from the correlating with the first reference data exceeds a threshold; and determining a length of the cyclic prefix based on a number of time-domain samples processed up to a time-instance associated with a detection output associated with correlation with the second reference data, wherein the first and second reference data are stored in memory of the receiver.

26. The method of claim 25 further comprising performing a modular operation on a value associated with the number of time samples processed during the correlating with the second reference data when a second correlation output from the correlating with the second reference data exceeds a threshold.

27. The method of claim 26 wherein the first reference data comprises at least portion of a first training sequence which correlates with a first of the training symbols, and wherein the second reference data comprises at least portion of a second training sequence which correlates with a second of the training symbols.

* * * * *

UNITED STATES PATENT AND TRADEMARK OFFICE
CERTIFICATE OF CORRECTION

PATENT NO. : 7,418,065 B2
APPLICATION NO. : 10/954650
DATED : August 26, 2008
INVENTOR(S) : Qiu et al.

It is certified that error appears in the above-identified patent and that said Letters Patent is hereby corrected as shown below:

Title Page, Item (56), under "Foreign Patent Documents", in column 2, line 2, below "WO WO-9917492 A1 4/1999" delete "WO WO 9917492 A1 4/1999".

Title Page, Item (56), under "Other Publications", in column 2, lines 5-6, below "8 pgs." delete "European Application No 19744 Office Action", (Sep. 21, 2007), 8 pgs.".

Title Page, Item (56), under "Other Publications", in column 2, lines 7-8, below "8 pgs." delete "International Search Report for corresponding PCT Application No. PCT/US2005/035287", (Feb. 27, 2006), 4 pgs.".

In column 9, line 19, in Claim 1, delete "match" and insert -- matched --, therefor.

In column 9, line 55, in Claim 7, after "portion" insert -- of --.

In column 10, line 66, in Claim 17, after "portion" insert -- of --.

Signed and Sealed this

Second Day of December, 2008

JON W. DUDAS
*Director of the United States Patent and Trademark Office*